No. 654,991. Patented July 31, 1900.
G. A. LOWRY.
MACHINE FOR MAKING GRASS TWINE.
(Application filed July 7, 1897.)
(No Model.) 8 Sheets—Sheet 1.

No. 654,991. Patented July 31, 1900.
G. A. LOWRY.
MACHINE FOR MAKING GRASS TWINE.
(Application filed July 7, 1897.)
(No Model.) 8 Sheets—Sheet 3.

Witnesses.
Wm. M. Rheem.
Wm. T. Henning.

Inventor
George A. Lowry
by Brown & Darby
Att'ys.

No. 654,991. Patented July 31, 1900.
G. A. LOWRY.
MACHINE FOR MAKING GRASS TWINE.
(Application filed July 7, 1897.)
(No Model.) 8 Sheets—Sheet 5.

No. 654,991. Patented July 31, 1900.
G. A. LOWRY.
MACHINE FOR MAKING GRASS TWINE.
(Application filed July 7, 1897.)
(No Model.) 8 Sheets—Sheet 7.

Fig. 12.

Witnesses
Inventor
George A. Lowry
by Brown & Darby atty's

UNITED STATES PATENT OFFICE.

GEORGE A. LOWRY, OF CHICAGO, ILLINOIS, ASSIGNOR TO THE NORTHWESTERN GRASS TWINE COMPANY, OF ST. PAUL, MINNESOTA.

MACHINE FOR MAKING GRASS TWINE.

SPECIFICATION forming part of Letters Patent No. 654,991, dated July 31, 1900.

Application filed July 7, 1897. Serial No. 643,768. (No model.)

*To all whom it may concern:*

Be it known that I, GEORGE A. LOWRY, a citizen of the United States, residing at Chicago, in the county of Cook and State of Illinois, have invented a new and useful Machine for Making Grass Twine, of which the following is a specification.

This invention relates to machines for making grass twine.

The object of the invention is to provide a machine which is of simple construction and which is efficient in operation for making grass twine.

The invention consists, substantially, in the construction, combination, location, and relative arrangement of parts, all as will be more fully hereinafter set forth, as shown in the accompanying drawings, and finally specifically pointed out in the appended claims.

Referring to the accompanying drawings, and to the various views and reference-signs appearing thereon, Fig. 12 is a view in vertical central longitudinal section of the twisting, thread-wrapping, and twine-feeding mechanism constructed in accordance with the principles of my invention.

The same part is designated by the same reference-sign whenever it occurs throughout the several views.

In the drawings reference-sign A designates a framework of suitable material, size, and arrangement to support the several parts of the construction hereinafter to be described.

Figures 8, 9, 11:
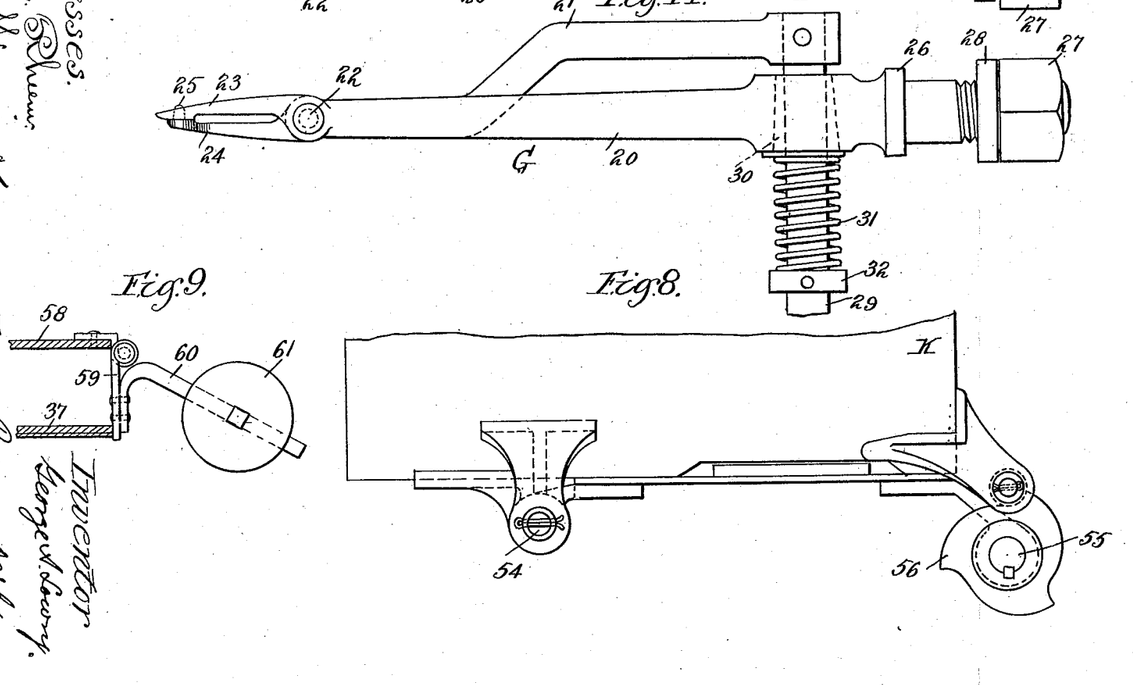
Fig. 8 is a broken detached detail view of the box or tray through which the grass is fed to the grippers, showing means for vibrating the same.
Fig. 9 is a similar view of the rear end of feedway, showing the weighted flap-door.
Fig. 11 is a view in side elevation of the same.
Figure 10:
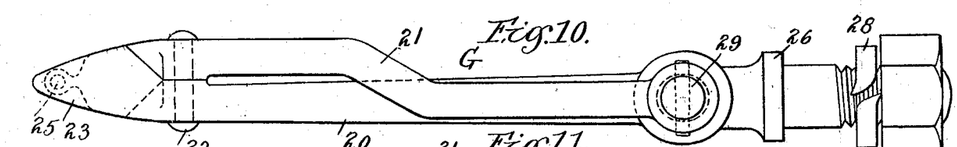
Fig. 10 is a detached detail view in plan of gripper embodying my invention.

Upon the framework A is mounted a shaft B, adapted to receive motion through the pulleys C from any suitable or convenient source and to transmit it to the various working parts of the apparatus. Upon framework A is mounted a shaft D, arranged to be driven from drive-shaft B through suitable gearing E. Mounted upon or arranged to be actuated by the shaft D is what I shall term the "gripper-carrier." Many different forms of arrangements of gripper-carriers may be employed, and, therefore, while I have shown a carrier in the form of a revolving wheel F, I do not desire to be limited or restricted thereto. The carrier F has mounted on the outer periphery thereof the grippers G, said grippers being arranged to project radially from the periphery of said carrier. These grippers have a peculiar construction and arrangement and manner of mounting, which I will now describe, particular reference being had to Figs. 10 and 11. Each gripper is composed of the two parts 20 21, pivotally connected, as at 22, after the fashion of nippers, as clearly shown. The part 20 is arranged to be rigidly held in and to project radially from the periphery of the carrier F, as will presently be more fully described. The extreme outer end of part 20 is formed into a flat lip 23, which is perforated, as shown, and the coöperating end 24 of the part 21 of the gripper is provided with a pin or projection 25, arranged to be received in the perforation in the lip 23. The extremity of end portion 24 is preferably circular shaped, or substantially so, struck from the center of the pin 25, as most clearly illustrated in Fig. 11. From this construction it will be seen that when the parts 20 21 of the gripper are relatively rocked about pivot 22 the end portions 23 24 open and close. It will be seen that the end portions 23 24 converge toward a common point from the pivotal point 22 and that said end portions are somewhat flattened. From this construction it will be understood that when the carrier F, upon the periphery of which the grippers are mounted to project radially, is actuated the passage of the grippers through the straw or grass to be formed into twine is facilitated, the grippers being arranged upon the carrier edgewise—that is, with the planes of the sides of the gripping-jaws in the plane of travel of the carrier—and, as will more clearly appear hereinafter, in position to pass through the stalks of grass lengthwise thereof.

Figures 4, 5:
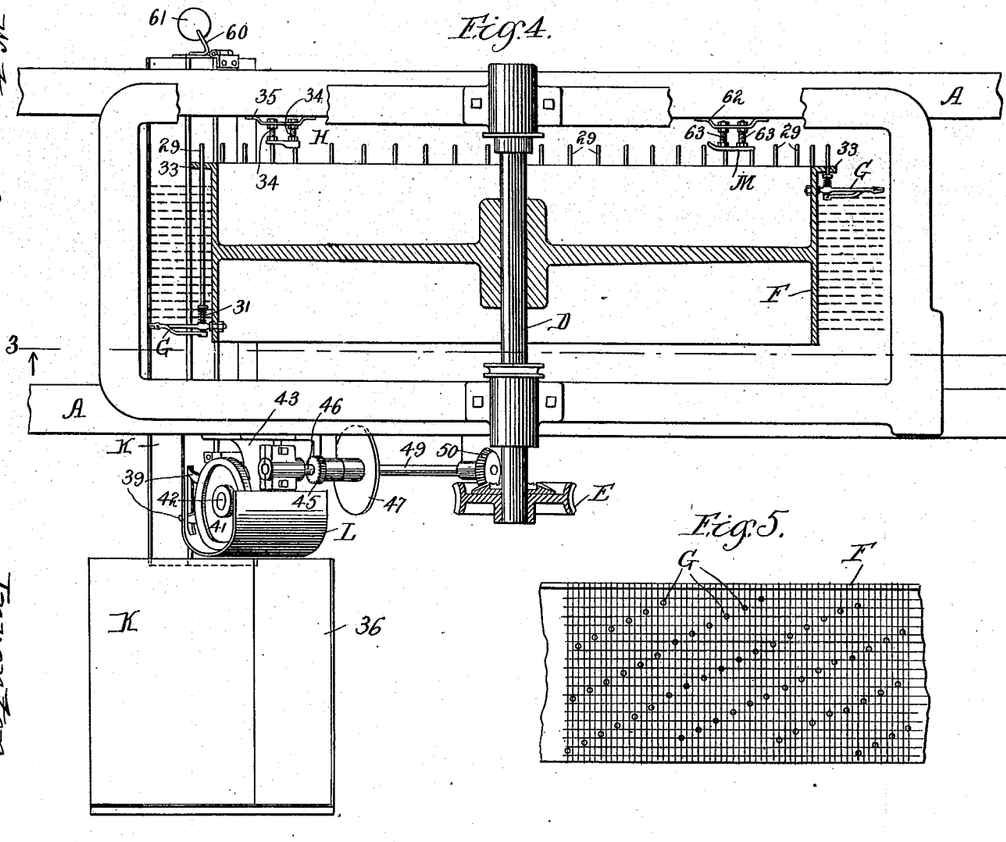
Fig. 4 is a horizontal sectional view on the line 4 4, Fig. 3, looking in the direction of the arrows.
Fig. 5 is a detached broken detail view in plan of the periphery of the gripper-carrier, showing the relative arrangement of the grippers.
Figure 6:
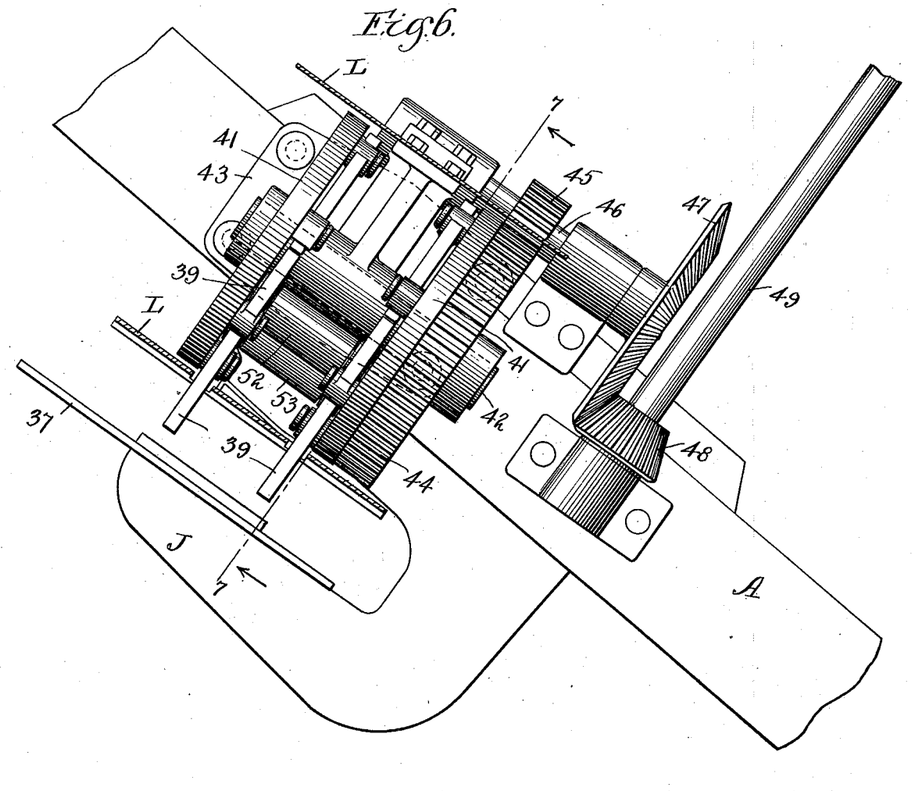
Fig. 6 is a broken detail view, in side elevation, showing mechanism for feeding the grass to the grippers.
Figure 7:
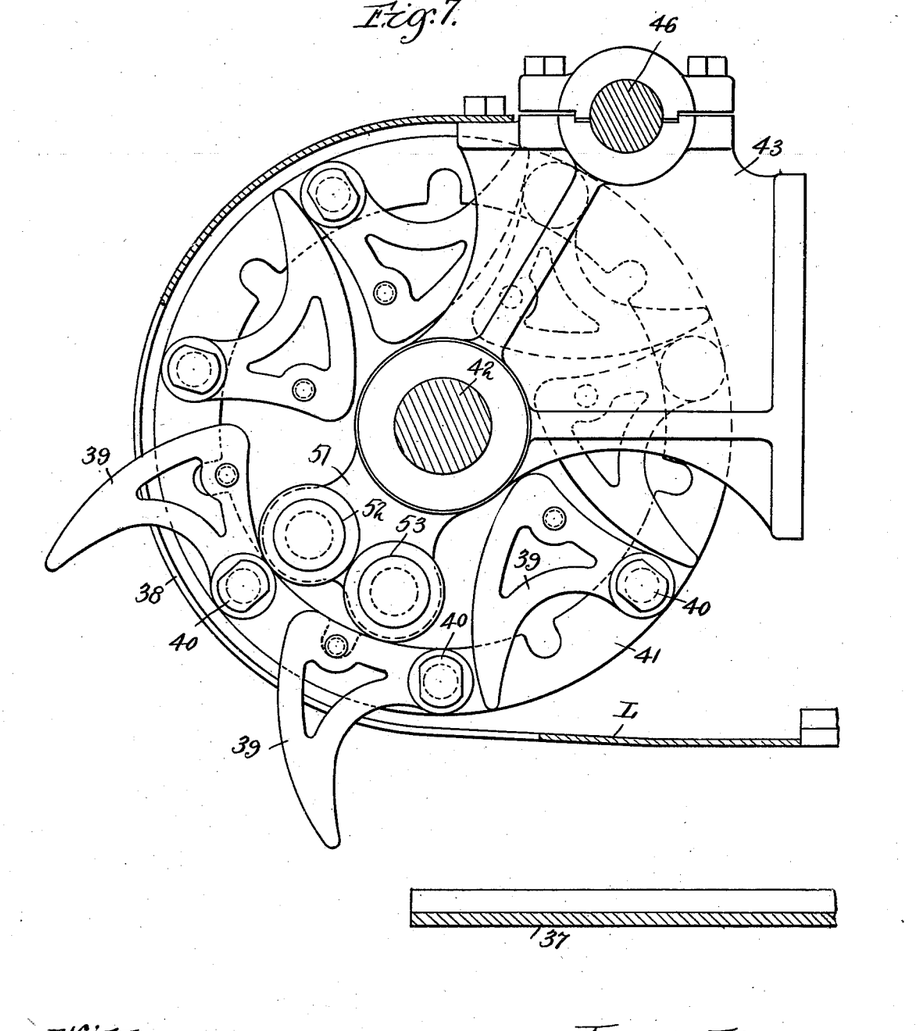
Fig. 7 is a sectional view of the construction shown in Fig. 6, taken on line 7 7, Fig. 6.

As indicated most clearly in Figs. 4 and 5, the periphery of carrier F is perforated and through such perforations the shanks of the parts 20 of the grippers pass. A shoulder 26 on the shank of part 20 serves as a bearing for the gripper part upon the outer surface of the carrier, and a set-nut 27, adapted to be received on the threaded end of said part, serves to clamp the gripper to the carrier. A spring-washer 28 is interposed between the nut 27 and the inner surface of the carrier.

During the passage of the outer ends of the grippers through the straw or grass in the operation of the machine the jaws of the grippers are opened and closed in order that one or more blades or straws of the grass may be grasped between said jaws, whereby the said straws are fed to the twine-forming mechanism, as will presently be more fully explained, and by forming the extreme end or clamping part of jaw 24 circular in shape, the circle being struck from the center of projection or pin 25, it will be seen that said jaw presents an equal flat clamping-surface on all sides, which surface is bounded by the circular edge above mentioned, thereby insuring the grasping of the stems or straws of grass by the jaws, either in advance of or to the rear of said pin or projection with reference to the direction of travel thereof, and hence thereby efficiently providing against any irregular or uneven position the straws or stems of the grass may assume in the presentation thereof to the action of the grippers.

I have designated the grippers generally by the reference-sign G, and by reference to Fig. 5 it will be seen that the grippers G are so relatively arranged on the periphery of carrier F as to cover the entire area thereof, and to this end said grippers are arranged in diagonal lines across the peripheral surface of the carrier, the individual grippers of one line being arranged out of line with the corresponding gripper of the preceding or succeeding line. In this manner it will be readily seen that the grippers command the entire area traversed by the carrier in the movements thereof through the grass, as will appear more fully hereinafter.

Many different forms of mechanism may be employed for opening and closing the gripper-jaws 23 24, and while I have shown and will now describe a specific form and arrangement thereof I do not desire to be limited or restricted thereto, as many changes and variations would readily suggest themselves to persons skilled in the art and still fall within the spirit and scope of my invention. In the form shown I pivotally secure one end of a rod 29 in the end of the shank of part 21 of the grippers and arrange said rod to pass loosely through a slot or aperture formed in the shank of stationary part 20. This aperture is indicated by dotted lines, as at 30, Fig. 11, and is somewhat larger than the rod 29, whereby said rod is allowed sufficient play therein to effect a rocking of part 21 about its pivot 22. Suitable means may be employed to normally and yieldingly hold the parts 20 21 of the grippers in such relative positions to close the gripping-jaws 23 24. In the form shown I provide a spring 31, which is mounted on rod 29 and bears at one end against the stationary part 20 and at the other end against a collar 32 mounted on said rod, as most clearly seen in Fig. 11.

In order that the rods 29 of the grippers may be automatically projected endwise and against the action of springs 31 to effect an opening of the jaws at the proper time to receive and grasp the stems of the straws—that is, during that portion of the travel of the carrier when the grippers are moving through the straws or grass—I mount said rods to slide back and forth in suitable guides or bearings formed on or carried by the carrier—say, for instance, a flange 33—and with their ends projecting therethrough, and I arrange a cam plate or shoe H in the path of the end of such rods and at a point adjacent to where it is desired to open the jaws of the grippers. By the engagement of the ends of rods 29 with the cam-surface H said rods are projected endwise, thereby effecting an opening of the jaws of the grippers, and when such cam-surface is passed the gripping-jaws again close upon each other under the influence of springs 31. The cam H is carried upon adjusting-bolts 34, (see Fig. 4,) suitably mounted in a bracket 35 upon the frame A, whereby the position of said cam with reference to the path of travel of the rods may be readily adjusted.

I will now describe the construction and arrangement of parts whereby the grass is presented to the action of the grippers, particular reference being had to Figs. 1, 2, 3, 4, 6, and 7.

Reference-sign J designates suitable brackets mounted on or supported by the main frame A, and upon said brackets I mount a tray or box K, into which the grass is deposited by hand or otherwise preparatory to being fed into position to be grasped by the grippers. Previously to being placed in the tray or box K the grass is suitably combed, so that the individual straws or stems of grass will be free from interlacing or tangles and assume a position parallel with respect to each other. The grass thus prepared is placed in the box or tray K with the butt-ends thereof all presented toward and resting against the lower wall 36 of said box or casing and with the tops thereof all presented in the opposite direction, as most clearly shown in Fig. 1. In order that the grass may be presented in a suitable manner, facilitating the action of the grippers in grasping the stems or straws thereof, the tray K is preferably arranged upon a slant downwardly toward the carrier, as clearly shown in the drawings. Arranged over the inner portion of the box or tray K is a plate L, between which and the bottom 37 of the tray or box or an extension of such bottom the grass is fed to the grippers. The plate L is arranged in inclined position to correspond with the inclined position of the box or tray, and the outer end of said plate is curved upwardly, as most clearly shown in Figs. 4 and 7, thereby facilitating the entrance of the stalks of grass into the space between said plate L and the plate 37. The plate L in the upturned end thereof is slotted, as at 38, and through the said slots operate the fingers 39. Fingers 39 are shaped in the form of triangular hooks pivotally mounted at one end, as at 40, upon plates 41, said plates being mounted on to rotate with a shaft 42, suitably journaled in a bracket 43, mounted upon the main framework. In practice I prefer to employ a pair of such plates or disks 41, and the fingers 39 are mounted in coöperating pairs on said disks or plates, respectively. The shaft 42 is arranged to receive rotary motion through any suitably-arranged gearing. In the particular form shown, to which, however, I do not desire to be limited or restricted, I mount on said shaft a gear-wheel 44, arranged to mesh with and to be driven by a gear 45, mounted on a shaft 46, suitably journaled in bracket 43, said shaft 46 being driven through the gears 47 48 from a shaft 49, which in turn is rotated through the gears 50 E from the shaft D or from any other suitable source. Carried by bracket 43 is an arm 51, (see Fig. 7,) arranged to project into proximity with the slots 38 in plate or shield L, and mounted on said arm and arranged in position to be engaged by the rear sides or edges of the fingers 39 are the pins or projections 52 53, which, if desired and in order to reduce friction and in the construction shown, may comprise friction-rollers.

From the foregoing description it will be seen that when rotation is imparted to the shaft 42, and hence also to disks 41, the fingers 39, carried thereby, are caused to be moved in a circular path. When said fingers reach the point in their path of travel adjacent to the rollers 52 53, said rollers successively engage the rear or inner edges of said fingers, thereby causing said fingers to rock about their pivots, and hence projecting the free ends of said fingers through the slots 38 in shield L and into position to engage and feed the grass contained in the space between said shield L and the plate 37, as clearly shown in Fig. 7. When the rollers 52 53 are passed, the continued rotation of the disks 41 and the opposition of the grass causes said fingers to be withdrawn from engagement with the grass, while the feed of the grass is carried on through the next succeeding finger. Thus it will be seen that the grass introduced to the tray K is positively fed and properly presented to the point in the path of travel of the gripper-carrier for the grippers to engage the straws and present them to the twine-forming mechanism, as will be more fully explained hereinafter.

In order that the grass introduced to tray K may be presented properly to the action of the feeding-fingers 39, I pivotally mount the tray K, as at 54, and I mount a shaft 55 in the brackets J or any other suitable or convenient position. Upon shaft 55 I mount a cam 56, upon the cam-surface of which one edge of the tray is arranged to rest, as clearly shown in Figs. 1, 2, and 8. By imparting rotation to shaft 55 it will be readily seen that the tray K is agitated, thereby facilitating the presentation of the grass to the action of the feeding-fingers 39. Rotation may be imparted to the shaft 55 in any suitable or convenient manner, as by means of a belt connection 57 to shaft D.

Figure 2:
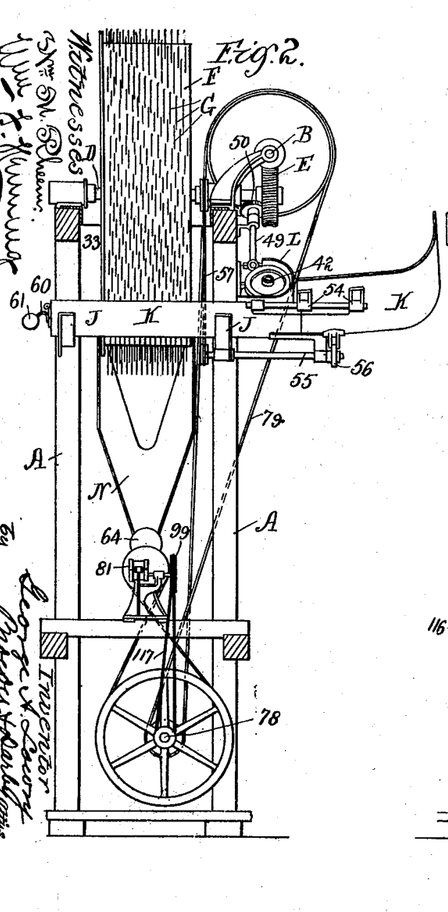
Fig. 2 is a front end elevation of the same.
Figure 3:
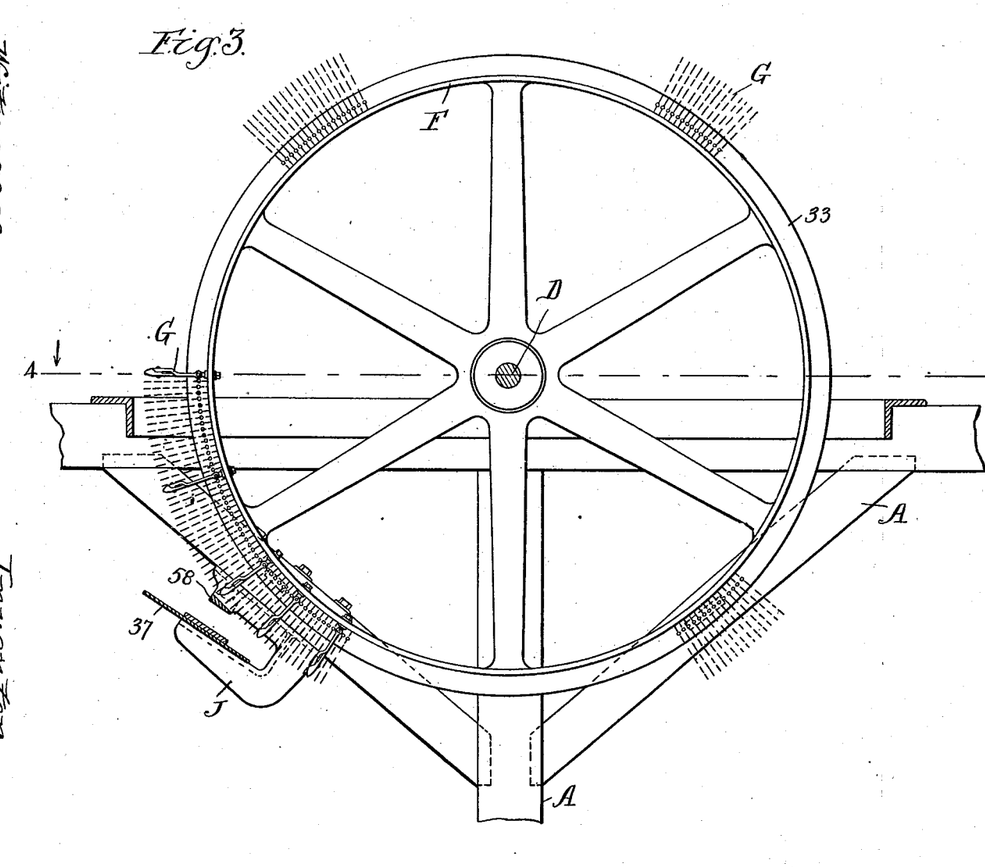
Fig. 3 is a view in side elevation of the gripper-carrier, parts being broken away and parts in vertical section.

In case the grass is fed to the position for the grippers to operate thereon too rapidly for the grippers to remove the same, it is important to provide means whereby a choking or congestion of the grass is prevented in the space between the plate 37 and the shield L or the breast-plate 58, Fig. 3, which is arranged in continuation thereof. In order to accomplish this purpose, I provide an outwardly-opening door 59 for the extreme left-hand end of the feedway for the grass, (see particularly Figs. 2 and 9,) and I suitably weight said door in order that it may be normally closed. To this end I mount an arm 60 thereon, upon which arm is adjustably mounted a weight 61, the tendency of which is to normally maintain the door 59 closed under an adjustable tension, but permitting said door to open when undue pressure from within the feedway is imposed thereon. From this construction it will be seen that if the grippers do not remove the grass stems or stalks with sufficient rapidity the continued action of the feeding-fingers 39 effects a continuous crowding of the grass into the feedway, until finally the pressure exerted thereby upon the door 59 is sufficient to overcome the weight 61, thereby forcing the door open and permitting the grass to drop out of the feedway. The weighted door 59 prevents the waste of the grass during the ordinary and proper operation of the machine by preventing such grass from being unduly forced out of the feedway.

The operation of the apparatus so far described will be readily understood and is as as follows: The grass is suitably introduced to the tray K and motion is imparted to shaft B, thereby effecting an actuation of carrier F and of the feeding-fingers 39, the latter presenting the stalks of grass into position to be grasped by the grippers G when the jaws thereof are opened and released by the ends of rods 29 passing the cam H. The grippers G each grasp one or more stems or stalks of the straw and carry the same therewith as the carrier continues its movement. The agitation of the tray K facilitates the proper presentation of the grass to the feeding-fingers 39. Upon a bracket 62, suitably secured to or mounted upon the frame A, are adjusting-bolts 63, which carry a cam M, arranged in the path of travel of the ends of rods 29 to engage said rods and project the same longitudinally to open the jaws of the grippers, thereby releasing the stems or stalks of grass held thereby. The mounting and engagement of the cam M are similar to that of cam H above described. Arranged adjacent to the point of location of cam M and in position for the stalks or stems of grass to drop therein when released from the jaws of grippers G, under the influence of said cam M, is a chute N, having the sides thereof inclined upwardly and outwardly away from each other, as clearly shown in Fig. 2. This chute may be formed of sheet metal and bent into substantially V shape in cross-section, and the entire chute is arranged upon an incline and in position to receive the stems or stalks of grass when dropped by the grippers. It will be understood that since the grippers grasp the butt-ends of the stalks of grass when such stalks are released the said butt-ends are in advance of the tops, and since the chute N is downwardly and rearwardly inclined relative to the direction of travel of the carrier when the stalks are released from the grippers they fall into the chute with the tops presented rearwardly therein with reference to the direction of travel of the carrier, and hence said tops occupy the lowest part of the bottom of the inclined chute. From the extreme lower corner of the chute extends a funnel 64, opening at the larger end into the chute and delivering at the smaller end into the twine-forming mechanism presently to be more particularly described.

From the above description of the relative arrangement of the grippers G on the periphery of the carrier it will be seen that the releasing of the straws or stems of grass by one pair of gripping-jaws is followed after the carrier has advanced a slight distance farther by the release of the stems or straws of the next succeeding gripper, and so on, thus successively and at predetermined intervals depositing the stems or straws of grass into the inclined chute N, from whence said straws pass, tops first, through the funnel 64 to the twine-forming mechanism, the top of one straw being immediately followed by the top of the next succeeding straw, thus breaking the joints, so to speak, and maintaining an even distribution of the several straws, successively forming the body to be twisted into the twine.

Figure 1:
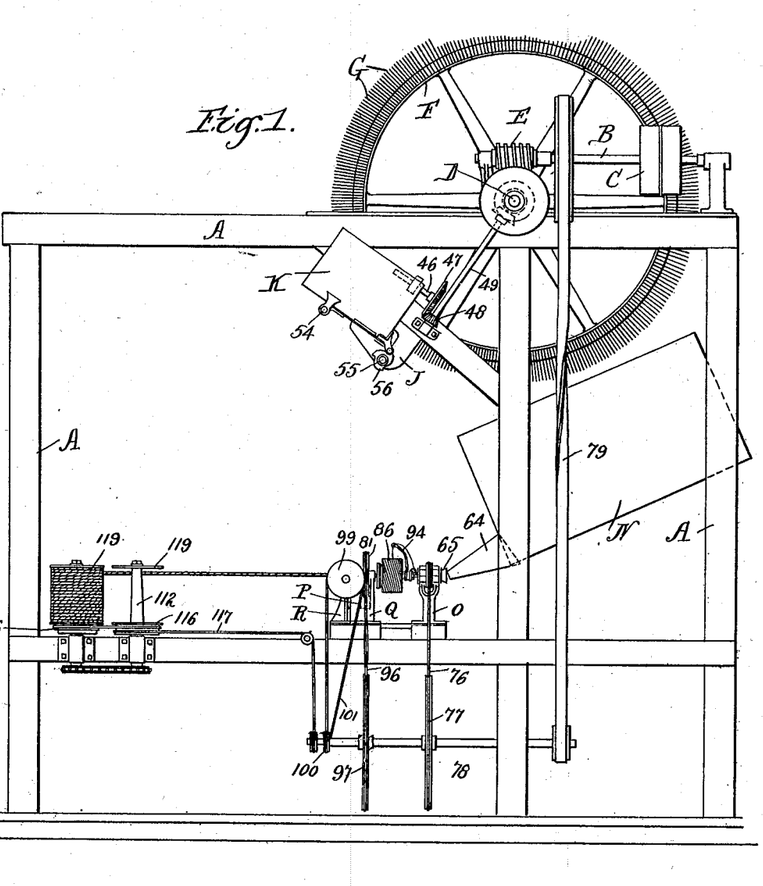
Figure 1 is a general view, in side elevation, of a grass-twine-making machine constructed in accordance with the principles of my invention.

I will now describe the construction, arrangement, and mode of operation of the twine-forming mechanism, particular reference being had to Figs. 1, 2, and 12.

Upon a suitable standard O is adjustably mounted a funnel-shaped sleeve 65. Any suitable, convenient, or desirable arrangement for securing a ready and proper adjustment of this sleeve may be employed. In the particular form shown said sleeve is carried by rod or stem 66, which is adjustably mounted in an arm 67, and which in turn is adjustably mounted in standard O. The enlarged mouth of funnel-sleeve 65 is presented toward and is arranged in close proximity to the delivery end of funnel 64, as clearly shown, and receives the straws therefrom. In suitable bearings formed in standard O and arranged to surround the funnel-sleeve 65 is mounted to rotate a sleeve 68, carrying a pulley 69, through which a rapid rotation is imparted to said sleeve. Suitable oil-ducts 70 may be provided for lubricating the bearings in which said sleeve 68 revolves. Pivotally mounted on said sleeve are the pair of arms 71, arranged to extend rearwardly therefrom, said arms terminating in clamping-jaws which are arranged to grasp the straws as they emerge from the rear or small end of sleeve 65. From this it will be seen that the straws to form the twine are grasped by the jaws of arms 71 and are twisted into twine form by the rotation of sleeve 68. Suitable springs 72 serve to press said jaws toward each other and into engagement with the straws. The arms 71, which are pivotally mounted, as at 73, have forward extensions 74, on which are adjustably mounted the weights 75. The rotation of sleeve 68 imparts to said weights a centrifugal force tending to rock the arms 71 about their pivots 73 in a direction to clamp the jaws of arms 71 upon each other, and by suitably adjusting the weights 75 the degree of this force may be regulated. Rotation may be imparted to the pulley 69 and sleeve 68 through belt connection 76 from a pulley 77 on shaft 78, suitably and conveniently journaled in the framework, and which shaft receives rotation from shaft B through the belt connection 79 or other suitable driving means.

From the foregoing description it will be seen that the stalks of grass are twisted into twine or cable form and that the cable thus formed is of uniform size, dependent upon the number of grippers in operation or the speed of actuation of the carrier, and hence upon the speed of feed of the individual straws. It will also be seen that the forming cable is grasped only at the point where the clamping-jaws of arms 71 operate, and the twisting of the straws into cable form at this point also imparts a whirl to the straws contained in the chute N and funnel 64, and hence preliminarily forming the body of the grass into form, adapting the said clamping-jaws to operate thereon to reduce the same to proper density and compression and to twist the same into twine or cable, and also such whirl causes the succeeding straws when dropped from the grippers to immediately enter as part of the whirling mass.

From the twisting mechanism above described the twisted and formed twine leads through a mechanism which I shall designate the "wrapping" mechanism, wherein the twine is spirally wrapped with thread. This mechanism includes a tubular shaft or sleeve 80, carrying a drive-pulley 81, through which rotation is imparted thereto, said shaft or sleeve being suitably journaled to rotate in bearings formed in standards P Q, mounted on the framework. Through the bore of this sleeve or shaft the formed twine is led. A balance-wheel 82, mounted on said shaft or sleeve, serves to give steadiness to its rotary action. Of course it will be understood that a rotation of shaft or sleeve 80 does not effect a rotation or twisting of the twine, the said sleeve being of sufficient diameter to enable the twine to pass freely therethrough. Upon the forward end of sleeve 80 is mounted a face-plate 83, upon which is detachably mounted a face-plate 84, carrying a tubular extension 85 of sleeve 80, the twine also passing through said tubular extension. Upon this extension is carried the spool of thread with which the twine is wound. In order that the extension 85 may be readily detached from the face-plate 83, to the end that the spool 86 of thread may be readily replaced by another, I slot one side of said face-plate 83, as at 87, and I similarly slot the opposite side of face-plate 84, as at 88, and a bolt 89, mounted in said plate 84, is arranged to pass through said slot 87, and a similar bolt 90, mounted in plate 83, is arranged to pass through slot 88. From this construction it will be seen that by tightening up on said bolts 89 90 said face-plates are clamped together and by loosening up on said bolts and without removing them from their respective plates said plate 84, carrying with it the spool 86, and the tubular extension 85 may be moved away from face-place 83 until the shoulder 91 clears the countersunk slot formed therefor in said plate 83, and then said plate 84 may be slid off of bolt 90. On the front end of extension 85 is screwed a tubular block or casting 92, the bore of which is in alinement with the bore of said extension and through which bore the twine leads. This casting loosely supports a sleeve 93, which carries the arms 94 95, through eyes formed in the outer ends of which the thread leads from the spool to the twine. The operation of this part of my invention is as follows, it being understood that the twine as rapidly as it is formed and wrapped is fed to a suitable reel and wound thereon. The mechanism by which such feed is accomplished will presently be more fully described. The twine passes through the bore of the tubular shaft 80 and its extension 85. Rotation is imparted to said shaft 80 through any suitable gearing—as, for instance, a belt 96 from pulley 81 to pulley 97 on shaft 78. Rotation is thus imparted to extension 85 and to the spool of thread 86. By suitably revolving the shaft 80 in a direction opposite to that in which the twister revolves—as, for instance, by crossing belt 96—it will be readily seen that the thread leading through the guide-arms 94 95 is wrapped spirally around the grass twine and in a direction opposite to the twist imparted to the twine. However, I do not desire to be limited to such reverse rotation. The pitch of the spiral wrappings of the thread upon the twine is of course dependent upon the relative speed of rotation of the spool and the feed of the twine.

It will be readily seen that by the arrangement and construction above described the wrapping-thread is applied to the twisted material at a point in close proximity to the twister-jaws and therefore before the twisted material can untwist after leaving such jaws. It will also be seen that the tubular shaft or sleeve which supports the spool of thread and through which the twisted and wrapped twine passes serves as a support and guide for the twisted and wrapped twine.

From the wrapping mechanism the twine passes through the clamping and feeding mechanism, by which it is fed as rapidly as formed from the twisting and wrapping mechanisms to the winding mechanism, presently to be described. The feeding mechanism comprises a shaft 98, suitably journaled in a standard R on the main frame and on which is mounted a pulley 99, geared to a pulley 100 on shaft 78 through belt connection 101, by which rotation is imparted to said shaft 98. Upon said shaft is mounted a roll 102, between which and a companion roll 103 the twine is arranged to pass. The said roll 103 is journaled in an arm 104, pivotally mounted, as at 105. A spring 106, mounted upon a rod 107 and arranged to bear upon said arm 104, serves to impart a suitable tension to said feed-roll 103, whereby the twine is grasped between the peripheries of said rolls 102 and 103 and properly held and fed when said rolls are rotated. The tension of said spring 106 may be adjustably regulated by means of the nut 108, mounted on the end of said rod 107 and against which said spring operates, as most clearly shown in Fig. 12. An extension 109 of arm 104 serves as a handle by which said arm may be rocked to release the twine from the grasp of said feed-rolls. Intermeshing gears 110 and 111 serve to rotate feed-roll 103 by the rotation of roll 102. By this construction it will be readily seen that the twisted and wrapped twine is fed from the twisting and wrapping mechanism.

Figures 13, 14:
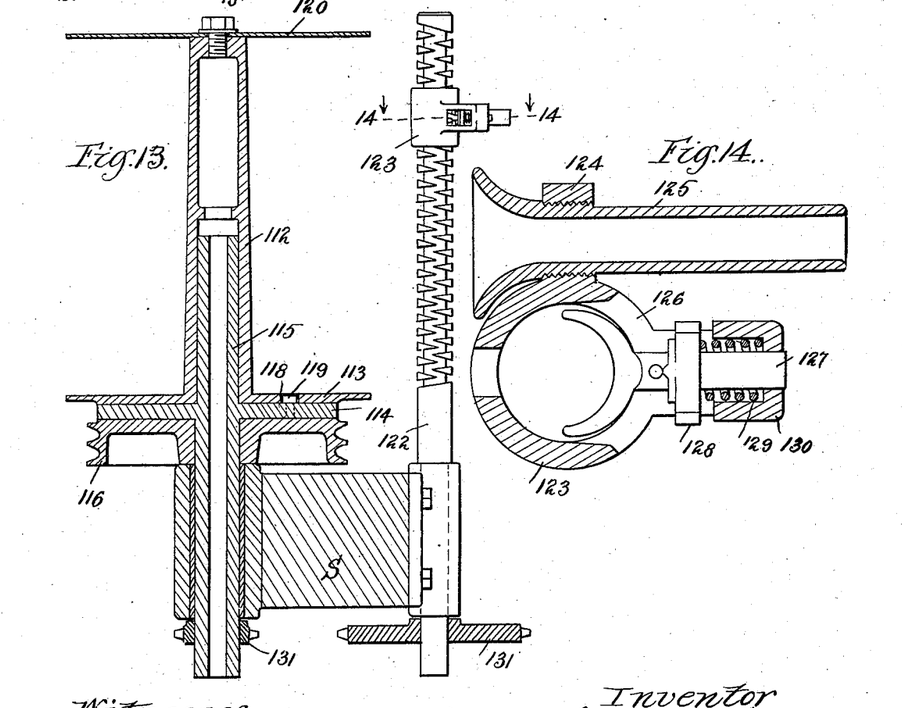
Fig. 13 is a view in vertical central section of the support or reel upon which the twine when formed is wound, showing the deployer by which the twine is properly guided and delivered to the reel.
Fig. 14 is a horizontal sectional view of the deployer-guide on the line 14 14, Fig. 13.

From the feeding mechanism the twine is delivered to the winding mechanism, by which it is wound into suitable reels or coils. Many different specific forms of construction for effecting the winding of the twine may be employed, and while I have shown a specific form of mechanism for accomplishing this purpose and one that is simple and efficient I do not desire to be limited or restricted thereto, as many changes therein and variations therefrom would readily suggest themselves to persons skilled in the art and still fall within the spirit and scope of my invention. In the particular form shown I provide a winding-reel comprising a tubular hub 112 and a supporting flange or disk 113 at the lower end thereof, said flange or disk being arranged to rest upon and to be supported by a disk or flange 114, formed or mounted on a shaft 115. Upon said shaft is loosely mounted a grooved pulley 116, and said shaft is supported by the flange 114, resting on the face of said pulley 116. Rotation is imparted to said pulley from any suitable or convenient source—as, for instance, from shaft 78—through belt connection 117 or other convenient form of gearing. The shaft 115 is suitably journaled in a convenient bearing formed in part S of the framework, and in the specific form shown the end of said shaft is arranged to project into the hub 112 of the reel. In practice, though not necessarily, I prefer to journal the shaft 115 in a vertical bearing, as shown, and in such case the said shaft and also the reel are supported by gravity by the flange or disk 114, resting upon the pulley 116, and the flange 113, resting upon plate or flange 114. From this construction it will be readily seen that when rotation is imparted to said pulley 116, through the frictional engagement of the faces of said pulley and plate or disk 114, a rotation is imparted to the shaft 115 and thence to the reel, at the same time permitting the reel to slip in case of undue strain, thereby preventing the too-rapid winding of the twine thereon. A positive engagement between the plates or disks 113 114 may be provided by arranging a slot or opening 118 in said plate or disk 113, in which is adapted to be received a projection 119, formed or mounted on plate or disk 114—as, for instance, in the form of a pin mounted in said disk 114 and having its head arranged to project into the slot or opening 118. On the upper end of the reel-tube 112 is arranged a plate 120, said plate being removably bolted to said tube, whereby it may be readily removed therefrom in order that the coil of twine when completed may be removed from the spindle or support 112, upon which said coil is wound. In order to facilitate the ready removal of the coil from its spindle-support 112, I preferably make said spindle or tube slightly tapering from the plate 113 to the other end of said support, as clearly shown in Fig. 13. From this construction it will be seen that when a coil of the desired size has been wound upon the spindle the plate 120 may be removed and the coil slipped endwise from the spindle or support upon which it is wound. It will also be seen from the construction above described that the entire reel may be readily removed by lifting the same until the slot 118 clears the projection 119 and until the said reel is withdrawn from the end of shaft 115. By arranging said shaft to project into the hub of the reel it will be seen that said reel is thereby supported properly and maintained in its proper position. The plate or disk 120 is provided with a notch or slot 121, cut in the periphery thereof, as clearly shown in Fig. 15, into which the end of the twine may be fastened, thereby securing said end in starting the coil or after the completely-formed coil has been severed from the twine.

Figure 15:
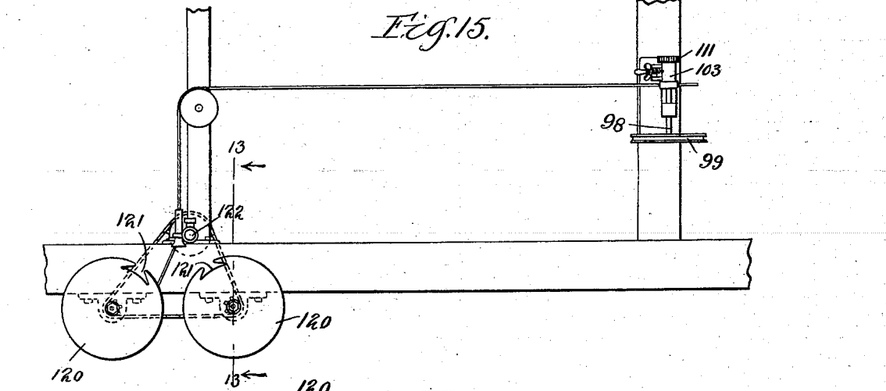
Fig. 15 is a view in plan of an arrangement of winding-reels embodying the principles of my invention.
Figure 16:
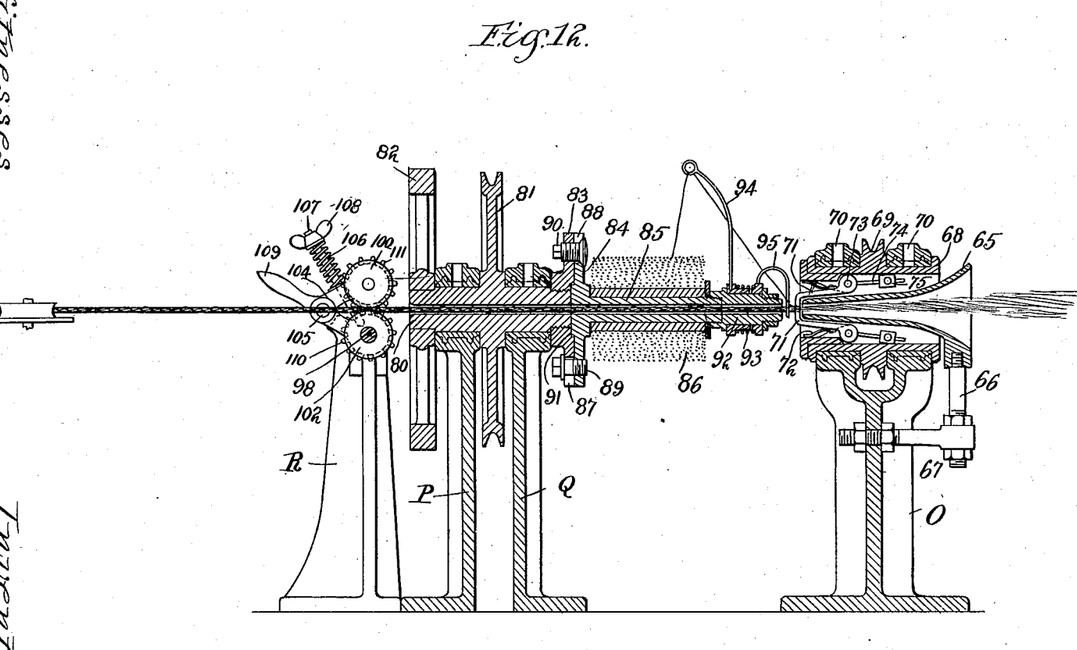

In practice I prefer to arrange a pair of reels in proper relation to each other, as clearly shown in Figs. 1 and 15, in order that when one reel has been filled the operation of the machine need not be arrested while said filled reel is being removed. Therefore by providing two or more of such reels adjacent to each other and in position to be rotated in unison as soon as the twine has been severed the end thereof is fastened in the adjacent unfilled reel, as above explained, and the coiling operation continues upon such reel while the previously-filled reel is being removed.

The plates or disks 113 and 120 form guides for the ends of the coils of twine, and the twine is wound into spiral coils upon the spindle or support 112 in the space between said plates or disks. It is important to provide means for suitably directing the delivery of the twine to the spindle to the end that said twine is coiled upon said spindle in successive layers or coils, each layer extending from the plate or disk at one end of the winding-spindle to that at the other end. Many different specific forms of mechanism may be employed to accomplish the desired object. As illustrative of the operative means, but to which I do not desire to be limited or restricted, I have shown what I shall designate a "deployer." This consists, as most clearly shown in Figs. 13, 14, and 15, of a shaft 122, suitably journaled in a convenient part of the framework and upon which is cut a double or reversing screw-thread, as shown most clearly in Fig. 13. Upon the threaded part of this shaft is mounted a sleeve 123, having a lug or projection 124 extending therefrom in which is mounted a guide-funnel 125, through which the twine is led. One side of said sleeve 123 is slotted, as shown at 126, Fig. 14, and through this slot projects a short rod 127, having the inner end thereof shaped to engage and follow the screw-threads formed on shaft 122. Said arm has a nut or washer 128 mounted thereon and a spring 129 interposed between said nut or washer and the wall of a projecting lug or casting 130, formed on sleeve 123 and through which the outer end of said valve 127 is arranged to project. The tendency of the spring 129 is to constantly press the inner end of rod 127 into mesh with the screw-threads of shaft 122. From this construction it will be seen that when rotation is imparted to said shaft 122 the sleeve 123 is caused to traverse back and forth the reversing-threads of said shaft, due to the intermeshing with said threads of the inner end of rod 127, and since the twine is led through the guide-funnel 125, carried by said sleeve 123, it will be seen that said twine is deployed properly and in the desired manner to form the successive layers of coils on the reel. The speed of travel of the sleeve upon shaft 122 is dependent upon the pitch of the screw-threads formed thereon and also on the relative speed of rotation of said shaft. Any suitable arrangement may be provided for rotating said shaft. I have shown a convenient arrangement wherein I mount a gear 131 upon said shaft, said gear being driven from a gear 131 upon shaft 115.

It is believed the operation of the machine will be readily seen and understood by persons skilled in the art from the foregoing specific description taken in connection with the accompanying drawings, and while I have shown and described a specific construction and arrangement of apparatus which is the best form in which I at present contemplate carrying my invention into practical operation I desire it to be understood that I do not limit or confine myself to the exact details of the construction and arrangement shown and described, as many variations therefrom and changes therein would readily suggest themselves to persons skilled in the art and still fall within the spirit and scope of my invention; but, Having now set forth the object and nature of my invention and a form of apparatus embodying in its construction the principles thereof and having described the construction, arrangement, function, and mode of operation of such apparatus, what I claim as new and useful and of my own invention, and desire to secure by Letters Patent of the United States, is—

1. In a machine of the class described, a carrier, grippers mounted thereon and projecting radially from the periphery thereof, said grippers having jaws adapted to be opened and closed, a feedway for the material, feeding-plates carrying pivoted fingers arranged to project into said feedway for positively feeding the stalks of grass into position to be grasped by said gripping-jaws, means for rotating said plates, and means for actuating said carrier, as and for the purpose set forth.

2. In a machine of the class described a feedway adapted to receive the material to be operated on, a carrier provided on the periphery thereof with radially-extending grippers having gripping-jaws said feedway arranged in the path of travel of said gripping-jaws, means for positively feeding the material to said gripping-jaws comprising rotary plates having pivoted fingers arranged to project into said feedway and gearing for positively rotating said plates and means for actuating said carrier, as and for the purpose set forth.

3. In a machine of the class described, a box or tray adapted to receive the material to be operated on, a carrier provided with gripping-jaws, said box or tray arranged in the path of travel of said gripping-jaws, a cam for agitating said box or tray, and means for actuating said carrier and cam, as and for the purpose set forth.

4. In a machine of the class described, a box or tray adapted to receive the material to be operated on, a portion of said box or tray being pivotally mounted, a carrier provided with gripping-jaws, said box or tray arranged in the path of travel of said gripping-jaws, a cam for rocking said pivotally-mounted portion of the box or tray and means for actuating said carrier and cam, as and for the purpose set forth.

5. In a machine of the class described, a carrier provided on the periphery thereof with gripping-jaws, a feedway for the material arranged transverse to the path of travel of said carrier, a feed-plate having pivoted feed-fingers for positively feeding the material to said feedway and means for actuating said carrier and plate, as and for the purpose set forth.

6. In a machine of the class described a carrier provided on the periphery thereof with radially-extending grippers having gripping-jaws, a feedway for the material arranged transverse to the path of travel of said carrier and inclined relatively thereto, feed-plates carrying pivoted fingers arranged to project into said feedway for feeding the material to said carrier, means for actuating said carrier and means for rotating said plates, as and for the purpose set forth.

7. In a machine of the class described a carrier provided on the periphery thereof with radially-extending grippers having gripping-jaws a feedway for the material, a box or tray arranged in communication with said feedway and adapted to receive the material, feed-plates carrying pivotally-mounted feed-fingers arranged to operate in said box or tray for feeding the material from said box or tray to said feedway and into the path of travel of said gripping-jaws and means for actuating said carrier and feed-fingers, as and for the purpose set forth.

8. In a machine of the class described, a carrier provided on the periphery thereof with gripping-jaws, a feedway for the material, a box or tray pivotally mounted and arranged in communication with said feedway, feed-fingers for feeding the material from said box or tray to said feedway, means for agitating said box or tray, and means for actuating said feed-fingers and carrier, as and for the purpose set forth.

9. In a machine of the class described, a carrier provided with gripping-jaws, a feedway for the material, rotary plates having pivoted fingers arranged to project into said feedway and adapted when actuated to feed the material into the path of travel of said jaws, means for actuating said plates, and means for actuating said carrier, as and for the purpose set forth.

10. In a machine of the class described, a carrier provided with gripping-jaws, a feedway for the material, disks having fingers pivotally mounted thereon, said fingers arranged to project into said feedway, means for rotating said disks whereby said fingers effect a feeding of the material into the path of travel of said gripping-jaws, and means for actuating said carrier, as and for the purpose set forth.

11. In a machine of the class described, a carrier provided with gripping-jaws, a feedway for the material, disks having fingers pivotally mounted thereon, means for rotating said disks, means arranged in the path of said fingers for projecting the same into the feedway and means for actuating said carrier, as and for the purpose set forth.

12. In a machine of the class described, a carrier having gripping-jaws mounted thereon, a feedway, a shaft arranged adjacent to said feedway and having disks mounted thereon, fingers pivotally mounted on said disks, means for rotating said disks, friction-rollers arranged in the path of travel of said fingers and arranged to engage and project the same into said feedway, and means for actuating said carrier, as and for the purpose set forth.

13. In a machine of the class described, a carrier provided with gripping-jaws, a feedway, plates having feeding-fingers for feeding the material through said feedway and into the path of said gripping-jaws, and means for yieldingly opposing the action of said fingers, and means for actuating said carrier and plates, as and for the purpose set forth.

14. In a machine of the class described, a carrier provided with gripping-jaws, a feedway, means for feeding the material through said feedway and into the path of said gripping-jaws, and a door for the end of said feedway, said door being yieldingly held in closed position, and means for actuating said carrier, as and for the purpose set forth.

15. In a machine of the class described, a carrier provided with gripping-jaws, means for actuating said carrier, a feedway for the material, said feedway provided with a door at the end thereof, a weighted arm attached to said door whereby it is normally and yieldingly maintained in closed position, means for adjustably regu'ating the tension of said weight, and means for feeding the material to said feedway, as and for the purpose set forth.

16. In a machine of the class described, a carrier, gripping-jaws mounted on the periphery thereof in diagonally-arranged transverse rows said gripping-jaws each comprising a stationary part, and a part hinged to said stationary part on a transverse axis, a rod connected to said hinged part, means for actuating said carrier, and means arranged in the path of travel of said rods for engaging the same whereby said rods are projected to open and close said jaws, as and for the purpose set forth.

17. In a machine of the class described a carrier provided with pairs of gripping-jaws arranged to extend radially and diagonally in transverse rows from the periphery thereof, one jaw of each pair being stationarily mounted on said carrier and the other jaw pivotally mounted on an axis transverse to said stationarily-mounted jaw, a rod connected to said pivotally-mounted jaw a spring for normally maintaining said jaws closed upon each other, and means arranged in the path of travel of said rods for successively engaging and projecting the same whereby said jaws are opened and closed, as and for the purpose set forth.

18. In a machine of the class described, a carrier provided with a side flange, pairs of gripping-jaws mounted on said carrier, one member of each pair being stationarily mounted on said carrier and the other member pivotally mounted on an axis transverse to said stationary jaw, a rod connected to said pivoted member and arranged to project through said flange, and means arranged in the path of the projecting end of said rod for engaging said end and projecting said rod endwise, as and for the purpose set forth.

19. In a machine of the class described, a carrier provided with a side flange, pairs of gripping-jaws mounted on said carrier, one member of each pair being perforated and rigidly mounted on said carrier and the other member being pivotally mounted on said rigid member, a rod connected to said pivoted member and arranged to pass through the perforation in the fixed member, and through said side flange whereby it is guided, and means arranged in the path of travel of the projecting ends of said rods for projecting the same endwise, as and for the purpose set forth.

20. In a machine of the class described, a carrier-wheel, gripping-jaws mounted upon the periphery thereof said gripping-jaws arranged in transverse diagonal rows and each comprising a stationary part and a part hinged or pivoted thereto, a rod connected to said hinged or pivoted part, means for actuating said carrier, cams arranged in the path of travel of said rods for successively engaging the ends thereof whereby said rods are projected to open said jaws, and means for adjusting said cams relative to the path of travel of the ends of said rods, as and for the purpose set forth.

21. In a machine of the class described, a carrier-wheel provided on the periphery thereof with pairs of gripping-jaws, arranged in rows diagonally across the periphery of said wheel, each succeeding pair of such jaws being arranged out of the peripheral line of the corresponding pair in the preceding diagonal row, and a cam arranged adjacent to the path of travel of said jaws for successively engaging the same to open and close them as they are carried by, as and for the purpose set forth.

22. In a machine of the class described, a carrier-wheel provided with pairs of gripping-jaws arranged to project radially from the periphery thereof, each succeeding pair of such jaws being arranged out of line both transversely and peripherally with respect to the preceding pair of jaws, a rod connected to one member of each pair of jaws for opening and closing the same, and a cam for successively engaging all of said rods, as and for the purpose set forth.

23. In a machine of the class described, a carrier comprising a cylindrical shell pairs of gripping-jaws mounted in said shell in transverse diagonal rows and arranged to project radially from the periphery of said wheel, one member of each pair provided with a shouldered shank arranged to pass through said shell, a clamp-nut for clamping said member to said shell the other member of said pair being pivotally mounted on the fixed member, means for automatically opening and closing successively all of said jaws, and means for actuating said carrier, as and for the purpose set forth.

24. In a machine of the class described a carrier having clamping-jaws radially mounted on the periphery thereof, plates having pivoted fingers for positively feeding the material into the path of travel of said jaws, means for automatically opening and closing successively the said jaws to grasp the material therebetween, means for actuating said plates and carrier, a receiver arranged in the path of travel of said carrier and means for automatically opening said jaws to deposit the material in said receiver, as and for the purpose set forth.

25. In a machine of the class described, gripping-jaws pivoted together, an operating-rod pivotally connected to one of said jaws, and means for actuating said rod, as and for the purpose set forth.

26. In a machine of the class described, a twisting device including a rotatable sleeve, clamping-jaws pivotally mounted thereon, and means for imparting a tension to said clamping-jaws directly proportioned to the speed of rotation of said sleeve, as and for the purpose set forth.

27. In a machine of the class described, a twisting device including a rotatable sleeve, clamping-jaws pivotally mounted thereon, said clamping-jaws being weighted, whereby through centrifugal force exerted upon said weighted jaws, and developed by the rotation of said sleeve, said jaws are clamped together with a tension proportioned to the speed of rotation of said sleeve, as and for the purpose set forth.

28. In a machine of the class described, a twister including a rotatable part, arms pivotally mounted on said rotatable part, said arms having clamping-jaws, and weights adjustably mounted on said arms, said weights and clamping-jaws being so relatively arranged that as the speed of rotation of said rotating part increases, the clamping effect of said jaws also increases, as and for the purpose set forth.

29. In a machine of the class described, a twister including a rotatable sleeve, arms pivotally mounted intermediate their ends upon said sleeve and having clamping-jaws at one of the ends thereof, and weights adjustably mounted on the other ends of said arms, as and for the purpose set forth.

30. In a machine of the class described, a twister including a rotatable sleeve, arms pivotally mounted on said sleeve and carrying coöperating clamping-jaws at one end thereof, and weights at the other end, and springs for normally pressing said clamping-jaw ends toward each other, as and for the purpose set forth.

31. In an organized machine for making grass twine, a carrier provided with radially-arranged gripping-jaws arranged in diagonal transverse rows, means for positively feeding the material into the path of said jaws, and means for opening said jaws to grip and release the material, and an inclined trough arranged to receive the material from said gripping-jaws, in combination with a twister adapted to receive the material from said trough, means for wrapping the twisted material with thread, and means for feeding the twisted and wrapped product from the machine, as and for the purpose set forth.

32. In an apparatus of the class described a twister having clamping-jaws arranged to grasp the material passing therethrough, a wrapping mechanism including a sleeve arranged in alinement with the twister and adapted to receive the twisted material from said clamping-jaws and support the same, and means for applying a wrapping-thread to the twisted material at a point between said twister and sleeve, and means for rotating said sleeve and twister, as and for the purpose set forth.

33. In an apparatus of the class described, a twister carrying clamping-jaws arranged to grasp the material passing therethrough, a wrapping mechanism including a tubular shaft arranged in alinement with said twister, and adapted to receive therethrough the twisted material from said clamping-jaws and to form a support therefor, a spool of wrapping-thread sleeved upon said shaft means for guiding the wrapping-thread to a point between said twister and shaft, and means for relatively rotating said twister and shaft, as and for the purpose set forth.

34. In an apparatus of the class described a twister-sleeve carrying clamping-jaws and arranged to grasp and twist the material passing through said sleeve, a tubular shaft arranged in alinement with said sleeve and adapted to receive longitudinally therethrough the twisted material from said clamping-jaws, and to form a support therefor a spool carrying wrapping-thread sleeved upon said shaft, means for guiding said thread from the spool to the twisted material at a point between said shaft and sleeve means for relatively rotating said sleeve and shaft, and means for feeding the twisted and wrapped material, as and for the purpose set forth.

35. In an apparatus of the class described, a wrapping mechanism including a tubular shaft, a spool carrying the wrapping-thread and sleeved upon said shaft, in combination with a twisting mechanism including a sleeve, twister-jaws carried thereby and arranged to deliver the twisted material to said tubular shaft whereby said shaft forms a support for the twisted material after it leaves the twisting mechanism, means for guiding the wrapping-thread to the twisted material at a point between said twister and shaft, and means for rotating said shaft and sleeve in opposite directions, as and for the purpose set forth.

36. In an apparatus of the class described twister-jaws arranged to grasp the material a tubular shaft arranged to receive the twisted material from said jaws, and to form a support therefor, a spool of wrapping-thread sleeved concentrically upon said shaft, means for applying the wrapping-thread to the twisted material as it emerges from the twister-jaws, and at a point between the twister-jaws and the tubular shaft, and means for rotating said jaws and shaft in reverse directions, as and for the purpose set forth.

37. In an apparatus of the class described twisting mechanism adapted to twist the material, a spool carrying the wrapping-thread said spool arranged to receive the twisted material longitudinally therethrough, whereby the twisted material is supported after leaving the twisting mechanism, means for guiding said thread to a point between said spool and twisting mechanism, and means for rotating said twisting mechanism and spool in opposite directions, as and for the purpose set forth.

38. In an apparatus of the class described a twister mechanism adapted to twist the material, in combination with a tubular shaft arranged in alinement with said twister mechanism and longitudinally through which the twisted material passes from said twister mechanism, said shaft thereby forming a support for the twisted material a tubular support for the wrapping-thread, said support sleeved upon and in concentric relation to said shaft, a guide-sleeve also mounted concentrically upon said shaft, means carried by said guide-sleeve for guiding the wrapping-thread to the twisted material, and applying the same thereto as it emerges from the twister mechanism, and at a point between such twister mechanism and said guide-sleeve, and means for reversely rotating said shaft and twisting mechanism, as and for the purpose set forth.

39. In an apparatus of the class described, a twister in combination with a wrapping mechanism including a tubular shaft, a tubular extension detachably connected to said shaft, said extension carrying the spool of thread, a thread-guide loosely sleeved upon said extension and means for feeding the material through said shaft and extension, as and for the purpose set forth.

40. In an apparatus of the class described, a twister in combination with a wrapping mechanism including a tubular shaft, a tubular extension detachably connected to said shaft, a spool of thread sleeved on said extension, thread-guides loosely sleeved on said extension, and means for feeding the material through said shaft and extension, as and for the purpose set forth.

41. In an apparatus of the class described, a twister in combination with a wrapping mechanism including a rotary tubular shaft carrying a flange, a flanged tubular extension, carrying the thread, a guide for the thread loosely sleeved upon said extension, and means for detachably securing said flanges together, as and for the purpose set forth.

42. In an apparatus of the class described, a wrapping mechanism including a rotary tubular shaft carrying a flange, said flange being slotted in the periphery thereof, and a tubular extension carrying a spool of thread, said extension also being provided with a flange, said flange being slotted in the periphery thereof and bolts secured in said flanges and respectively arranged to pass through said slots, as and for the purpose set forth.

43. In an apparatus of the class described, a wrapping mechanism including a rotary tubular shaft having a peripherally-slotted flange, said flange being provided with a countersunk seat in the face thereof, and a peripherally-slotted flanged tubular extension carrying the wrapping-thread, the flange of said extension provided with a shoulder adapted to be received in said seat, bolts arranged to pass through the slots in said flanges, for detachably clamping the same together and means for feeding the material through said shaft and extension, as and for the purpose set forth.

44. In an organized machine for making grass twine, a twisting mechanism, means for delivering the grass, straws, or stalks thereto one after the other in uniform succession and at uniform distances apart, a wrapping mechanism arranged to receive the twisted material from said twisting mechanism and adapted to apply a wrapping-thread thereto, a feeding mechanism arranged to feed the twisted or wrapped material through said wrapping mechanism, in combination with a winding-reel arranged to receive the twisted or wrapped material and means for actuating said several mechanisms in unison, as and for the purpose set forth.

45. In an organized machine for making grass twine, a twisting mechanism, means for delivering thereto the stalks or stems of grass, one after the other in uniform succession a wrapping mechanism arranged to receive the material from said twisting mechanism, and to apply a wrapping-thread thereto, and a feeding mechanism for feeding the twisted and wrapped material through the machine, in combination with a winding-reel arranged to receive the twisted and wrapped material, and a deployer for guiding the material to and along said reel, and means for actuating said several mechanisms in unison.

46. In a machine for making grass twine, a winding mechanism comprising two or more shafts arranged in proximity to each other, a common drive-gear for all of said shafts, an independent reel mounted on each shaft, and a single deployer for all of said reels, said deployer arranged to guide the material to either one or the other of said reels, whereby when one reel has been filled said deployer may deliver the material to another and adjacent reel while the filled reel is being removed, as and for the purpose set forth.

47. In an organized machine for making grass twine, the combination of the following elements, a feedway, means for feeding the material thereto a carrier having grippers arranged in successive diagonal rows and adapted to project into said feedway, a chute, means arranged to open said grippers successively when they arrive adjacent to said chute whereby the stalks or stems of grass are successively deposited in said chute, a twisting mechanism arranged to receive the material from said chute and adapted to impart a twist thereto, a wrapping mechanism arranged to receive the twisted material from said twisting mechanism and adapted to apply a wrapping-thread thereto, a feeding mechanism for the wrapped material, a winding mechanism arranged to receive the material from said feeding mechanism and adapted to wind the same upon a reel, a main drive-shaft, and means for actuating said several mechanisms from said drive-shaft, as and for the purpose set forth.

48. In a machine for making grass twine, the combination of a drum having a peripheral flange with openings therethrough nippers extending from the periphery of the carrier, said nippers having jaws, one of the jaws being pivoted, a rod secured to the pivoted jaw of each nipper, said rod extending through one of the openings of the flange of the carrier, means for normally holding the pivoted jaw of the nipper in close contact with the other jaw of said nippers, a mechanism located exteriorly of the carrier and adapted to act successively on the rod of the pivoted jaw in order to impart thereto a sliding movement and thereby turn the pivoted jaw of the nipper out of closed contact with the other jaw of said nipper.

49. In a machine for making twine, the combination of a carrier nippers carried thereby, said nippers having jaws, one of the jaws being pivoted, a rod slidingly engaging one of the jaws and connected to the pivoted jaw, cams adapted to act successively on the rod of the pivoted jaw of each nipper at the proper time, and means for closing the nipper after the cam has ceased to act on the pivoted jaw.

50. In a machine for making twine the combination, of a nipper having jaws, one of said jaws being movable, a rod slidingly engaging one of the jaws and connected to the movable jaw, means for sliding the rod endwise in order to bring the movable jaw of the nipper out of closed contact with the other jaw of said nipper, and means for normally holding the movable jaw of the nipper in closed contact with the other jaw of said nipper.

51. In a machine for making twine the combination of a carrier nippers carried thereby, said nippers having jaws, one of the jaws being pivoted, a rod pivotally connected to said pivoted jaw, means adapted to act successively on the rod of the pivoted jaw of each nipper in order to open the nipper at the proper time, and means for closing the nipper after the opened ones have ceased to act on the pivoted jaw.

52. In a machine for making twine the combination of a nipper having jaws, one of said jaws being movable, a rod pivotally connected to said movable jaw, means for sliding said rod endwise in order to bring the movable jaw of the nipper out of closed contact with the other jaw of said nipper.

53. In a machine for making grass twine, a feedway, a carrier, nippers arranged to project radially from the periphery of said carrier and in diagonal rows, means for opening and closing said nippers while passing through said feedway and means for opening said nippers for delivering the straws therefrom, whereby the straws are delivered successively, as and for the purpose set forth.

In witness whereof I have hereunto set my hand this 28th day of June, 1897, in the presence of the subscribing witnesses.

GEORGE A. LOWRY.

Attest:
S. E. DARBY,
FRED. P. BECKER.